(12) United States Patent
Melzer et al.

(10) Patent No.: US 9,765,237 B2
(45) Date of Patent: Sep. 19, 2017

(54) METHOD FOR TREATING THE SURFACE OF A METALLIC SUBSTRATE

(71) Applicant: AMAG ROLLING GMBH, Braunau am Inn - Ranshofen (AT)

(72) Inventors: Carsten Melzer, Weng/Überackern (AT); Torsten Grohmann, Braunau am Inn (AT); Ulrich Schubert, Wöllersdorf (AT); Sarah Meyer, Vienna (AT)

(73) Assignee: AMAG Rolling GmbH, Braunau am Inn—Ranshofen (AT)

( * ) Notice: Subject to any disclaimer, the term of this patent is extended or adjusted under 35 U.S.C. 154(b) by 0 days.

(21) Appl. No.: 14/651,388

(22) PCT Filed: Dec. 11, 2013

(86) PCT No.: PCT/EP2013/076299
§ 371 (c)(1),
(2) Date: Jun. 11, 2015

(87) PCT Pub. No.: WO2014/090911
PCT Pub. Date: Jun. 19, 2014

(65) Prior Publication Data
US 2015/0337171 A1 Nov. 26, 2015

(30) Foreign Application Priority Data
Dec. 11, 2012 (EP) .................................. 12196593

(51) Int. Cl.
*C09D 183/06* (2006.01)
*B05D 1/38* (2006.01)
(Continued)

(52) U.S. Cl.
CPC ............. *C09D 183/06* (2013.01); *B05D 1/38* (2013.01); *B05D 7/544* (2013.01); *B32B 15/20* (2013.01);
(Continued)

(58) Field of Classification Search
CPC ...... C23C 18/122; C09D 183/06; B05D 1/38; B05D 7/544; B32B 2255/06; B32B 2255/24; B32B 15/20; Y10T 428/31663
See application file for complete search history.

(56) References Cited

U.S. PATENT DOCUMENTS

| | | | |
|---|---|---|---|
| 5,486,578 A | * | 1/1996 | Carpenter, II ......... C08G 77/04 427/387 |
| 5,939,197 A | | 8/1999 | Blohowiak et al. |

(Continued)

FOREIGN PATENT DOCUMENTS

WO 2011156438 A1 12/2011

*Primary Examiner* — Vishal I Patel

(57) ABSTRACT

An advantageous method for treating the surface of a metallic substrate made of aluminum or an aluminum alloy, comprising the following steps: providing a water-based mixture with a sol, comprising alkoxy silanes of general chemical formula $Si(OR)_4$ and organoalkoxy silanes of general chemical formula $R''Si(OR')_3$, in which R and R' are linear or branched, short-chained hydrocarbon groups with at least one hydroxyl group and R" is an organic group with a glycidoxy-, merkapto-, amino-, methacryl-, allyl- and/or vinyl-group, applying the mixture to the surface of the metallic substrate and at least in sections, hardening the mixture with a formation of a sol-gel coating connected to the metallic substrate.

12 Claims, 3 Drawing Sheets

(51) Int. Cl.
*B05D 7/00* (2006.01)
*B32B 15/20* (2006.01)
*C23C 18/12* (2006.01)

(52) U.S. Cl.
CPC ........ *C23C 18/122* (2013.01); *B32B 2255/06* (2013.01); *B32B 2255/24* (2013.01); *Y10T 428/31663* (2015.04)

(56) References Cited

U.S. PATENT DOCUMENTS 9,079,774 B2* 7/2015 Chaumonnot .......... C01B 37/00
2011/0293950 A1* 12/2011 Kim ...................... A47J 36/025
428/447

* cited by examiner

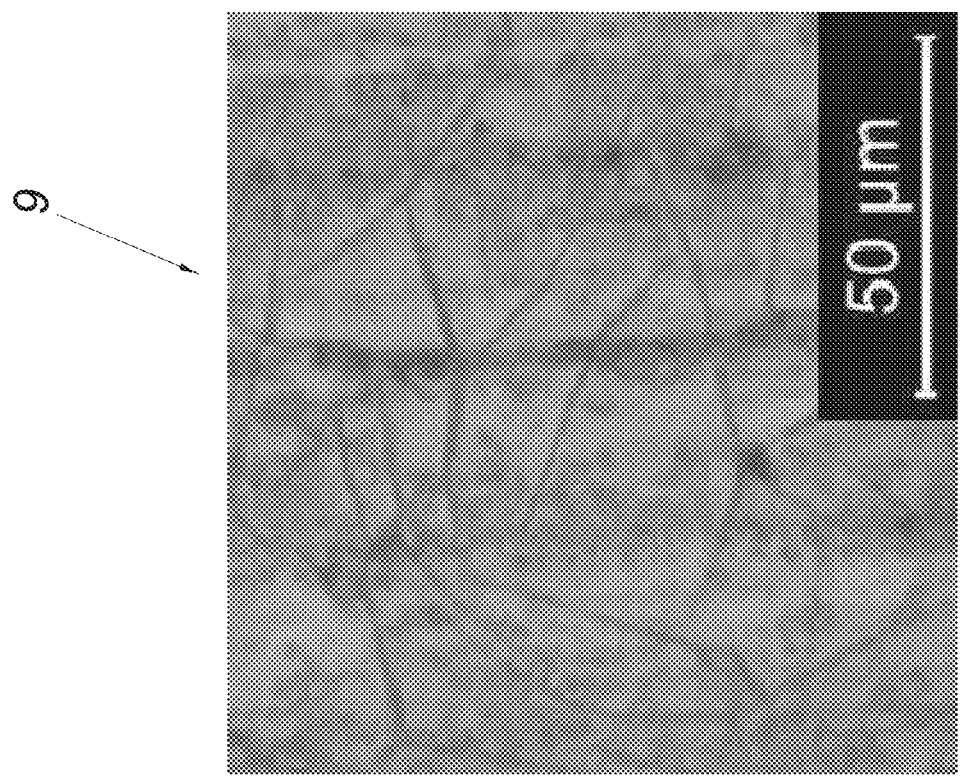
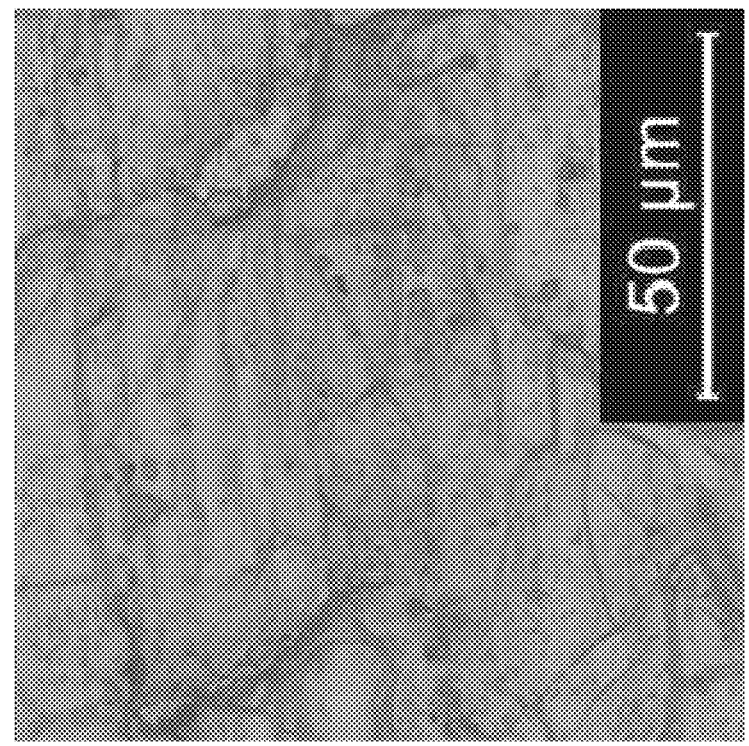
FIG. 3a
FIG. 3b

METHOD FOR TREATING THE SURFACE OF A METALLIC SUBSTRATE

FIELD OF THE INVENTION

The invention relates to a method for treating the surface of a metallic substrate of aluminum or an aluminum alloy.

BACKGROUND OF THE INVENTION

From the prior art, numerous methods for coating the surface of a metallic substrate are known. For this, various known precursors, typically organoalkoxysilanes, zirconium alkoxides, and organic acids acting as complexing agents in an alcohol solution, for instance of ethanol or isopropanol, are used. Handling such methods is disadvantageous, not least because of the use of the alcohols mentioned, since their boiling points are comparatively low. Among other effects, this means that because of changes in concentration, the coating process becomes less controllable. Accordingly, comparatively great technical effort and expense must be employed in order to be able to meet workplace-relevant regulations in terms of safety and health. To improve the method, U.S. Pat. No. 5,939,197 shows a method for surface treatment of metal, especially of titanium and aluminum alloys (for instance the AA 7xxx group), for which various aqueous solutions of organoalkoxysilanes and zirconium alkoxides are proposed. In this method, zirconium alkoxides with short-chain organic radicals or mixtures with various chemical additives are used, as well as an organoalkoxysilane with a reactive organic group and acetic acid. The organoalkoxysilanes are intentionally those that have short alkoxysilane radicals that comprise 2 to 5 carbon atoms; one of these four radicals has an additionally chemically reactive group, such as a 3-aminopropyl or a 3-glycidoxypropyl radical. In this way, the attempt is made to make a coating available that adheres well and is durable. Nevertheless, such a method proves disadvantageous, since in the mixing of the starting compounds, a two-phase system first forms, which requires several hours to homogenize. Moreover, alcohols with a low boiling point, which are formed in the course of the sol-gel process or are added as solvents, worsen the controllability of the method because of a constant change in the composition of the reaction mixture. Furthermore, volatile alcohol vapors are potentially quite dangerous.

SUMMARY OF THE INVENTION

It is therefore the object of the invention, based on the prior art, to furnish a method for treating the surface of a metallic substrate, in particular sheet-metal, of aluminum or an aluminum alloy, which on this sheet metal makes a sol-gel coating, comprising a water-based mixture with a high and adjustable pot life, possible that not only adheres well and is corrosion-resistant but is also economical and easy to handle. In particular, the suitability of the method for large-area application on metallic substrates should be taken into account.

If the water-based mixture has a sol having alkoxysilanes having the general chemical formula $Si(OR)_4$, in which R is linear or branched short-chain hydrocarbon radicals with at least one hydroxyl group, then the water solubility of an organosilane, which can be used as a precursor for sol-gel processes, can be ensured both elegantly and simply. The same is also true for organoalkoxysilanes, also contained in the sol, having the general chemical formula $R''Si(OR')_3$, in which R' is linear or branched short-chain hydrocarbon radicals having at least one hydroxyl group and R'' is an organic group having a glycidoxy, mercapto, amino, methacryl, allyl, and/or vinyl group. This can represent a substantial advantage in making it possible to reach the goals of the method, namely and in particular low costs, simplified execution, a highly safe process, avoidance of the risk of explosion, health protection, and not least the capability of large-area application. This mixture, which can even be formed by the sol itself, can in fact be applied, with comparatively simple method steps, to the surface of the aluminum or an aluminum alloy metallic substrate, in particular sheet metal, and can be hardened at least regionally, forming a sol-gel coating bonded to the metallic substrate. Thus economical treatment of the surface of the metallic substrate becomes possible, using methods of strip coating, in particular roll coating, but also spraying, immersion or quenching methods.

One advantage is that the method of the invention can be performed in an aqueous solution, that is, with a water-based mixture, even without also adding an emulsifying solvent. Thus despite the use of water, from the very outset a single-phase precursor solution is formed, which simplifies the course of the method considerably. Since multivalent alcohols with sufficiently emulsifying effect are formed anyway, disadvantageous phase separations can also be avoided in the further course of the sol-gel process. Thus the method of the invention is distinguished by high variability with regard to the chemical composition of the mixture and/or to the addition of compounds in the course of the sol-gel process.

In the method of the invention, it has additionally been surprisingly found that the hydrolysis and condensation processes that take place in the course of the sol-gel process, which are known to be competing reactions in the course over time, have an especially advantageous course. This applies not least to the unexpectedly long and intentionally variable pot life, that is, the time until the onset of gelification in the sol-gel process. Because of the increased pot life, a substantial objective of the method, namely its simplified performance, for instance in treating large metal surfaces, can be attained. Moreover, it has been found that because of the use of water and the relatively high boiling points of the multivalent alcohols formed from the precursors, the method is suitable for large-area usage and application to metallic substrates that have elevated temperatures, without the occurrence of premature gelification and thus the development of non-homogeneous films.

In these respects, it can be assumed that in the course of the gel formation on the surface of the metallic substrate—among other reasons because of the use of water without additional solvents and because of the properties of the multivalent alcohols, such as their low volatility—the various equilibrium reactions, occurring in parallel, of hydrolysis and condensation are positively affected. The multivalent alcohols formed in the reaction additionally act as flow and leveling agent and thus lead to a more-uniform coating. As a result, and also because of the lengthened pot life, the method of the invention is also suitable for treating larger surfaces as well as for application with the aid of rollers (strip coating, coil coating, or can coating), which is especially superior to the prior art, in which primarily immersion coatings are made or small-scale artisanal application is done.

As a result, in the final analysis, the chemical properties, the structural morphology and the binding of the sol-gel coating to a metallic substrate can be improved. This can be demonstrated not least by a uniform sol-gel coating on the surface of a metallic substrate. In particular, because of the presence of the multivalent alcohols, the tendency to fissuring while drying at elevated temperature is reduced markedly. Thus it is made possible by the invention for instance that a surface of a metallic substrate can already be coated with good coverage with a relatively thin sol-gel film, which can have decisive advantages not only in terms of further processing, such as adhesive bonding—among other reasons, because the mechanical strength, for instance of adhesive bonding via sol-gel coatings, drops as the thickness of the sol-gel coating increases. Moreover, when the multivalent alcohols are given off, the explosion limits are not reached as easily.

In general, it is noted that a metallic substrate can for instance be a surface film of a semi-finished product, cast part, finished product, component or structural element or the like. In particular, the invention can be suitable for a metal sheet as a semi-finished product. However, these objects can also be entirely made up of the aluminum or aluminum alloy metallic substrate.

Advantageously, R" is an organic group—in particular as a linear or branched short-chain hydrocarbon radical—with a glycidoxy, mercapto, amino, methacryl, allyl, and/or vinyl group. Thus besides the inorganic reactivity of the sol or gel with the surface of a metallic substrate, organo functional groups can also be made available. Thus improved reactivity with an organic substrate, such as an adhesive layer or lacquer layer applied to the sol-gel coating, can be attained, and the aforementioned advantages of the method can be preserved.

For the sake of completeness, it is noted that the term "short-chain hydrocarbon radical" can be understood to mean a radical having from 2 to 6 carbon atoms. The term "precursor" is understood to mean components of the mixture having organosilanes.

If R is a 2-hydroxyethyl radical, then the above can be used/achieved especially advantageously. For instance, the method can specifically be performed not only with precursors that are economical to produce but also their especially good water solubility can be attained. Moreover, from such precursors, ethylene glycol is formed during the sol-gel process, and it is especially readily miscible with water and has a boiling point of 196° Celsius. Because of the low vapor pressure, it volatilizes from the mixture in only slight quantities, which among other effects leads to a chronologically more-stable composition of the coating solution and thus to longer pot lives. It was also possible to produce ethylene glycol from the multivalent alcohol, which makes especially good results possible with regard to the development of a sol-gel coating on a metallic substrate.

The same is true if R' is a 2-hydroxyethyl radical.

With the method of the invention, especially good results can be attained if the sol has the following: 5 to 10 weight % tetrakis(2-hydroxyethoxy)silane and 0.5 to 3.5 weight % 3-glycidoxypropytris(2-hydroxyethoxy)silane.

If the mixture additionally has metal oxides, especially of zirconium, aluminum and/or titanium, having the general chemical formula M $(OR''')_x$, in which R''' is a linear or branched short-chain hydrocarbon radical, in particular an n-propyl, isopropyl and/or n-butyl radical, then the surface of a metallic substrate can be coated in a way that is especially resistant to corrosion. This makes use of known effects for improving the corrosion-inhibiting factors in the network of the sol-gel coating.

It is accordingly demonstrated that the method—as already explained—can ensure great variability with regard to the chemical substances that can be used.

If R''' has at least one hydroxyl group, the aforementioned advantages with regard to water solubility, low vapor pressure, improved gel formation, etc., can be attained. In particular, the result is a sol-gel process with components that have similar chemical properties, which can further enhance the aforementioned advantages of the method.

If the mixture contains a complexing agent, in particular an organic acid and/or a β-diketone, the reactivity of the metal oxides in the course of the method of the invention can be adapted to the organoalkoxysilanes and thus the sol-gel process can be better controlled. This can prove to be a decisive factor in terms of the aforementioned advantageous sol-gel coating of a metallic substrate.

A mixture that has 0.3 to 4.5 weight % metal oxides, in particular tetra-(n-propyl) zirconate or tetra(isopropyl) titanate and 0.3 to 9 weight % of a complexing agent, in particular acetic acid has distinguished itself.

If the surface of the metallic substrate has aluminum or an aluminum alloy, or if this substrate comprises these, the method of the invention can be used especially advantageously. Not only can an especially firmly adhering and durable coating thereon be attained, but if large-area application is needed, there are also advantages such as reduced costs and longer pot life as well as advantages in terms of the technical process.

If the surface of the sol-gel coating is joined to an organic layer, the method of the invention can be suitable for numerous uses. Because of the described properties of the sol-gel coating, the connection to such an organic layer can be done especially durably. It has been found that for this, epoxy and/or polyurethane adhesive layers or various lacquer layers are especially well suited to this purpose. Thus the sol-gel coating can serve as both an adhesive and a lacquering pretreatment of a surface of a metallic substrate.

If surfaces, having a sol-gel coating, of two metallic substrates are bonded to one another via an adhesive layer, this can be done especially firmly and in a way that is resistant to corrosion.

The use of the water-based mixture of the invention with a sol, having alkoxysilanes with a general chemical formula $Si(OR)_4$ and organoalkoxysilanes having the general chemical formula $R"Si(OR')_3$, in which R and R' are linear or branched short-chain hydrocarbon radicals with at least one hydroxyl group and R" is an organic group having a glycidoxy, mercapto, amino, methacryl, allyl, and/or vinyl group, for surface treatment of an aluminum or aluminum alloy metallic substrate is especially suitable for surface treatment of a metallic substrate, in particular of a metal sheet, of aluminum or an aluminum alloy, which can also advantageously be further processed and/or treated.

This use can be improved if R and/or R' is a 2-hydroxyethyl radical and/or R" is a 3-glycidoxypropyl radical.

In general, it is noted that especially in a metal sheet of an aluminum alloy (such as AA 7xxx group), the aforementioned advantageous properties can be established—but in general it is conceivable to use the method of the invention in order to produce a metallic substrate of aluminum or an aluminum alloy having a surface that has a sol-gel coating.

BRIEF DESCRIPTION OF THE DRAWINGS

In the drawings, the subject of the invention is shown in further detail in terms of an exemplary embodiment. In the drawings:

FIGS. 3a and 3b are micrographs of a plan view on surfaces of metallic substrates treated with organosilanes.

DETAILED DESCRIPTION OF THE PREFERRED EMBODIMENTS

For coating according to the invention of a surface of an aluminum alloy, this surface is as a rule first degreased and/or pickled. Depending on the composition of the alloy of the metallic substrate, various means and mixtures of alkaline and acidic systems are available, for instance based on potassium hydroxide solution or sulfuric acid in combination with fluorides. In the exemplary embodiment, for alloys of the AA 7075 series, this is done by alkaline degreasing using potassium hydroxide solution and surfactants. Next, rinsing is done with deionized water, whereupon pickling is performed using a mixture of sulfuric and hydrofluoric acid. The degreasing or pickling can be done for instance by means of an immersion or spraying method (spray degreasing method or spray pickling method). After a further rinsing with deionized water, the metal sheet is dried. Hot air can suit the purpose, or other drying methods may be employed, for instance using nonwoven-covered rollers.

Figure 1:
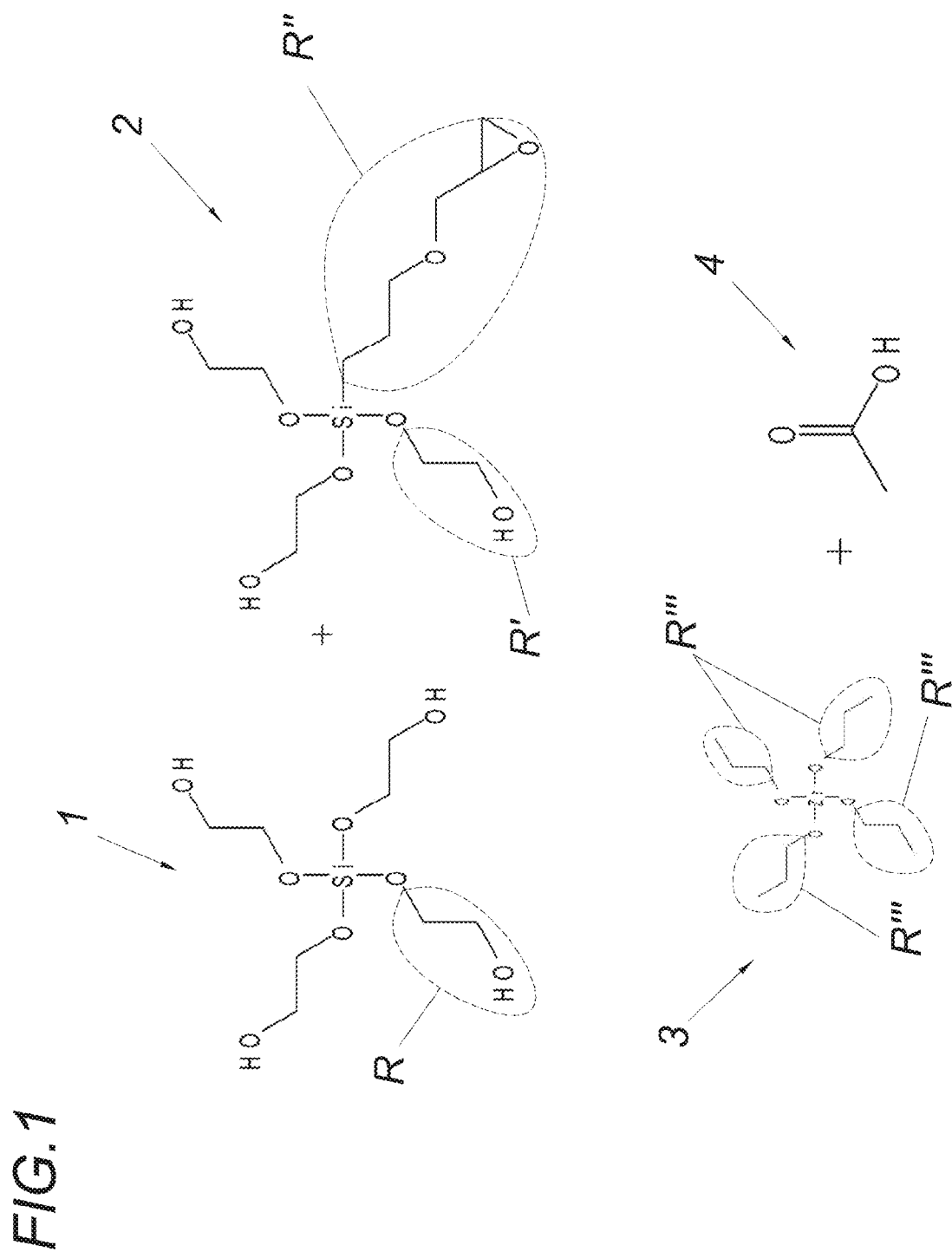
FIG. 1 is a schematic representation of the structural formulas of the precursors used and of the complexing agent.

After that, coating of the surface is done, using a mixture according to the invention (M_erf) made from 6.2 weight % tetrakis(2-hydroxyethoxy)silane—marked 1 in FIG. 1;

1.3 weight % of 3-glycidoxypropytris(2-hydroxyethoxy)silane—marked 2 in FIG. 1;

2.5 weight % tetra-(n-propyl) zirconate—marked 3 in FIG. 1;

3.2 weight % acetic acid—marked 4 in FIG. 1; and the remainder being water.

In this kind of exemplary mixture, and this mixture itself can be considered a sol, a reaction equilibrium ensues in which approximately 12.5 weight % of volatile organic compounds, predominantly ethylene glycol, are present.

As needed, various additives can be added to the mixture of the invention (M_erf), in order to adapt the processing properties of the sol to the requirements at the time. These additives may for instance be wetting agents, flow and leveling agent, foam-damping agents, dispersion aids, or UV stabilizers. Still other inorganic or organic inhibitors can also be added to further increase the corrosion resistance. For example, mercaptobenzylthiazoles, mercaptobenzimidazoles, $Mg(NO_3)_2$, $Ce(NO_3)_2$, $Cr(NO_3)_3$ and comparable substances would be suitable, for example.

The application of the mixture is done by immersion coating, but as already noted, this can also be enabled in other ways—that is, the viscosity of this mixture is advantageous, so that an application can easily be done with the aid of rollers, which is advantageous especially if large-area coatings are needed.

A further essential improvement is that the pot life of this mixture—depending on the conditions under which the method takes place—can be as long as several hours. In contrast to known methods, this is a considerably longer length of time, which clearly makes the method of the invention easier.

The gelification that ensues takes place with the aid of the method as described, also in an advantageous way. The gel that develops is decisively improved over the prior art in terms of its makeup, cross-linking, stability, and especially in its bonding with the metal surface. This must be due not least to the fact that in the course of the hydrolysis, ethylene glycol is formed, which as already described does not volatilize until the application to the substrate, has emulsifying properties and leads to a better course of the coating method. In this connection, the advantage that until drying, practically no toxic and/or explosive vapors escape should be mentioned again.

The drying can take place at a substrate temperature of 100-200° Celsius, preferably 130° Celsius; in the process it is demonstrated that even with this comparatively rapid performance, complete coverage of the surface by the hardened coating is preserved. However, it is also conceivable to perform drying at low temperatures, for instance by choosing a comparatively high rate of air convection. Typically, the temperature can be 60° Celsius—with infrared heat sources, even lower temperatures are entirely conceivable, which can be advantageous for sparing adjacent other materials, such as seals.

Figure 2:
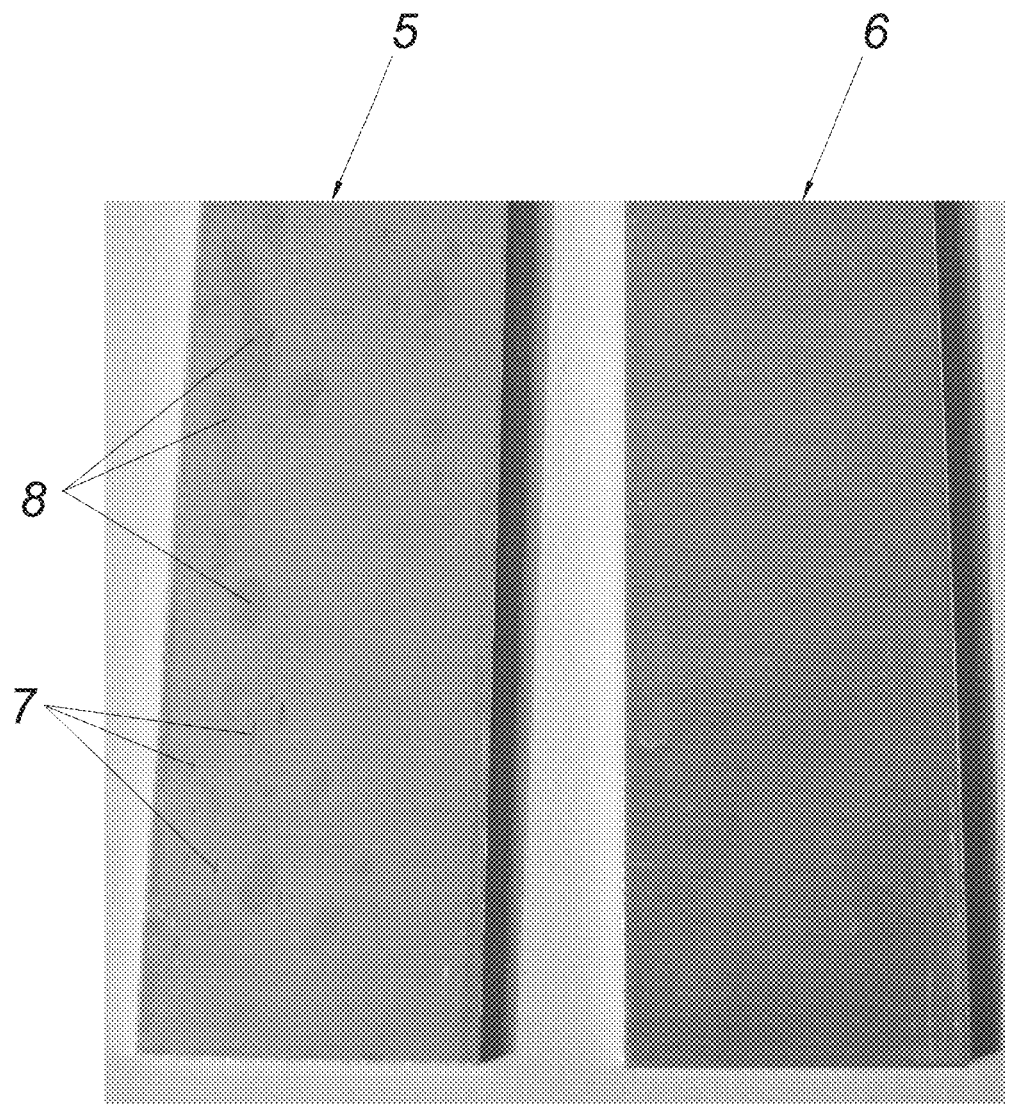
FIG. 2 is a plan view on two surfaces, treated with a mixture having organosilanes, of metallic substrates.

This can be seen from FIG. 2, which shows two coated metal sheets 5, 6 comprising the aluminum alloy AA 7075. The sheet 5 was treated with a mixture of the prior art (M_SdT) of 6 weight % tetraethoxy silane and 1.9 weight % 3-glycidoxypropyltrimethoxy silane, 1.7 weight % tetra-(n-propyl) zirconate and 1.6 weight % acetic acid, the remainder being water—while the sheet 6 was being treated with the mixture of the invention in accordance with this exemplary embodiment. Thus on the surface of the sheet 5, even with the naked eye, cracks 7 and areas 8 of increased thickness of the sol-gel coating can be seen, while in contrast, in the case of the sheet 6 treated according to the invention, a comparatively uniform, homogeneous coating takes place. Disadvantageously, the coating of the sheet 5, that is, the surface of the sheet 5, has areas 8 and cracks 7 that not only represent reduced protection of the sheet 5 but also impair an ensuing treatment/processing of the sheet 5. It is thus also demonstrated that the method of the invention makes it possible, with the aid of a comparatively thin coating, to ensure that the surface of the sheet 6 is fully covered and protected, which not least produces the aforementioned advantages upon possible ensuing lacquering or upon the connection of two metallic substrates having a surface with a sol-gel coating that are connected to one another via an adhesive layer. This is also significant because the sol-gel coating, with increasing thickness, is less resistant to mechanical stresses.

In micrographs as well, the especially advantageous embodiment of the coating can be seen. This is shown in FIG. 3a, in which fissuring extending over the coating can be seen, but the fissures are distributed comparatively uniformly and in terms of their width are in the low single-digit micrometer range. Suitably advantageous coatings can also be achieved with a metal sheet 9 comprising a 6XXX aluminum alloy—as can be seen from FIG. 3b.

The aforementioned advantages, in the results of testing the tensile strength, are as shown in Table 1. For that purpose, the surfaces of metal sheets of an AA7075 alloy were treated with the above-recited mixture of the prior art (M_SdT), and these treated surfaces were glued together with the aid of an epoxy adhesive. In the same way, this was done with metal sheets using the mixture of the invention (M_erf). The tensile strength of these bonded lap joints was determined by exerting a tensile force that acts parallel to the adhesive surface and to the primary axis of the metal sheets.

TABLE 1

| Coatings | $\tau_{max}$ [N/mm$^2$] |
|---|---|
| M_SdT | 28.2 |
| M_erf | 32.7 |

$\tau_{max}$ represents the maximum force per unit of surface area that resists overlapping adhesion in the tensile shear test.

Thus it can be demonstrated that the mixture of the invention not only offers advantages in terms of processing capability and environmental and health protection, etc., but also, a metallic substrate with an especially advantageous sol-gel coating is obtained, whose morphology is clearly and decisively superior to the prior art. It is thus demonstrated that and for what reason the characteristics of the coating produced according to the invention can offer improvements for instance with regard to the strength of adhesive bonds there are also the advantages of two treated surfaces.

The invention claimed is:

1. A method for treating a surface of a metallic substrate of aluminum or an aluminum alloy, comprising:
    furnishing a water-based mixture having a sol, having alkoxysilanes with a general chemical formula Si(OR)$_4$ and organoalkoxysilanes having the general chemical formula R"Si(OR')$_3$, in which R and R' are linear or branched short-chain hydrocarbon radicals with at least one hydroxyl group and R" is an organic group having a glycidoxy, mercapto, amino, methacryl, allyl, and/or vinyl group,
    applying the mixture to the surface of the metallic substrate, and
    at least regionally hardening the mixture, forming a sol-gel coating bonded to the metallic substrate.

2. The method of claim 1, wherein R is a 2-hydroxyethyl radical.

3. The method of claim 1, wherein R' is a 2-hydroxyethyl radical.

4. The method of claim 1, wherein R" is a 3-glycidoxypropyl radical.

5. The method of claim 1, wherein the sol comprises:
    5 to 10 weight % tetrakis(2-hydroxyethoxy)silane; and
    0.5 to 3.5 weight % 3-glycidoxypropyltris(2-hydroxyethoxy)silane.

6. The method of claim 1, wherein the mixture is acid-free.

7. The method of claim 1, wherein the mixture further comprises metal oxides of zirconium, aluminum and/or titanium, having the general chemical formula M(OR''')$_x$, in which R''' is a linear or branched short-chain hydrocarbon radical selected from the group consisting of an n-propyl, isopropyl and n-butyl radical.

8. The method of claim 7, wherein R''' has at least one hydroxyl group.

9. The method of claim 7, wherein the mixture further comprises a complexing agent selected from the group consisting of an organic acid and a β-diketone.

10. The method of claim 7, wherein the mixture comprises:
    0.3 to 4.5 weight % metal oxides selected from the group consisting of tetra-(n-propyl) zirconate and tetra(isopropyl) titanate; and
    0.3 to 9 weight % of a complexing agent comprising acetic acid.

11. The method of claim 1, wherein a surface of the sol-gel coating is bonded to an organic layer comprising an epoxy and/or polyurethane adhesive layer or a lacquer layer.

12. The method of claim 1, wherein surfaces of two metallic substrates, each having a sol-gel coating, are bonded to one another via an adhesive layer.

\* \* \* \* \*